Figure 1:
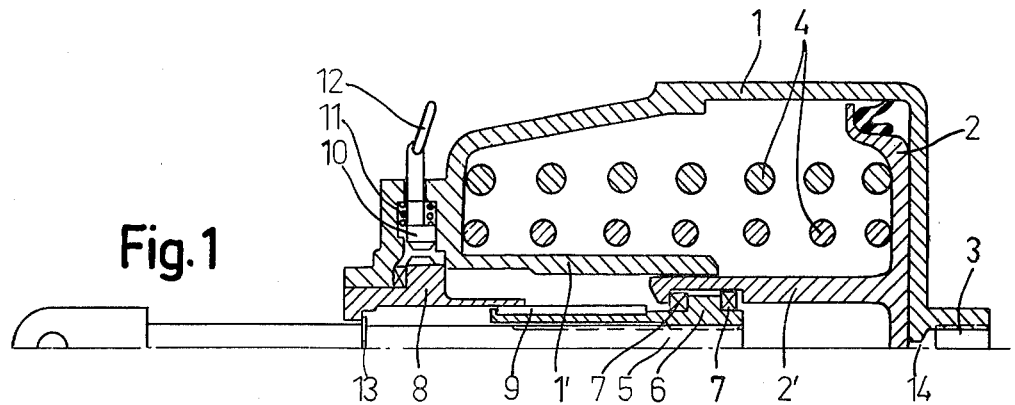

United States Patent [19]

Aurousseau et al.

[11] 4,230,021
[45] Oct. 28, 1980

[54] GOVERNING DEVICE FOR A SPRING BRAKE ACTUATOR

[75] Inventors: André Aurousseau, Argenteuil; Michel Roger, Ville d'Avray, both of France

[73] Assignee: Svenska Aktiebolaget Bromsregulator, Malmo, Sweden

[21] Appl. No.: 841,045

[22] Filed: Oct. 11, 1977

[30] Foreign Application Priority Data

Oct. 11, 1976 [SE] Sweden ................................ 7611248

[51] Int. Cl.³ ............................................. F15B 11/08
[52] U.S. Cl. ....................................... 91/461; 91/517; 92/29
[58] Field of Search ................... 91/45, 509, 514, 517, 91/461; 92/48, 63, 64, 29

[56] References Cited

U.S. PATENT DOCUMENTS

| 3,188,916 | 6/1965 | Beatty | 92/63 |
| 3,255,676 | 6/1966 | Berg | 92/63 |
| 3,359,869 | 12/1967 | Avrea | 92/63 |
| 3,893,552 | 7/1975 | Dahl | 91/517 |
| 4,014,579 | 3/1977 | Dubois | 92/63 |
| 4,063,491 | 12/1977 | Roger | 92/63 |

*Primary Examiner*—Abraham Hershkovitz
*Attorney, Agent, or Firm*—Laurence R. Brown

[57] ABSTRACT

A spring brake actuator has a quick release clutch for deactivating the brake in absence of fluid pressure and a governing device operating the clutch in response to the relative pressures prevailing at the service brake and spring brake cylinders. The governing device comprises a biased pilot valve and a signal valve which permit alternate operation of the brake release clutch manually or automatically.

5 Claims, 5 Drawing Figures

GOVERNING DEVICE FOR A SPRING BRAKE ACTUATOR

This invention relates to a governing device for a spring brake actuator, provided with means for discontinuing and automatically restoring the operational function thereof and having a spring-biased clutch, which only has to be disengaged for discontinuing the operational function, the governing device being supplied with the same air pressure as a service brake cylinder.

A brake system for a vehicle, in this case preferably a rail vehicle, may be provided with both an ordinary air-pressure actuated service brake cylinder and a spring brake actuator, which as known has a piston acted on by a working spring in a brake applying direction and by a counteracting air pressure in the brake release direction. The spring brake actuator is primarily used at parking, but may also in some cases be used for emergency brake purposes. The spring brake actuator may be provided with means for discontinuing and automatically restoring the operational function thereof. Such means are conventional and does not form any part of the present invention per se. A typical example of such means is shown in U.S. Pat. No. 4,063,491 to which reference is made for further details. However, in short the purpose of the means is primarily to enable a brake release operation without having available any air pressure for compressing the working spring. The means are operated from the outside, whereafter it is possible to bring back the piston rod of the actuator, for example by means of a return spring. At a new admission of air under pressure the actuator will restore its operational function automatically due to the constructional features of the means.

Normally, the service brake cylinder and the spring brake actuator will be controlled separately. The service brake cylinder will be supplied with air under pressure from a brake valve at each service braking, whereas an air pressure will have to prevail constantly in the spring brake actuator except at parking (or possibly at an emergency), when the air pressure is decreased therein by a separate valve.

There are several disadvantages with this system: Beside the normal brake valve for the service brake cylinder a separate valve for the spring brake actuator is needed. If the air pressure in the actuator disappears, a manual operation is necessary. The working spring is normally held compressed, and an unintended loss of air pressure therein may lead to accidents due to locking of the vehicle wheels.

These and other disadvantages are according to the invention removed by a governing device of the kind referred to above, which is characterized by
 a pilot valve, containing a valve-closing, prestressed spring and a brake cylinder pressure actuated diaphragm and only admitting the brake cylinder pressure to the actuator at a pressure prevailing at maximum service braking,
 an operating device, comprising a diaphragm on either side acted on by the brake cylinder pressure and the actuator pressure, the diaphragm being connected to means for giving a clutch disengaging signal, when the actuator pressure is higher than the brake cylinder pressure, and
 calibrated nozzles for preventing a fast pressure decrease in the actuator.

The calibrated nozzles are preferably arranged in the governing device between the outlet to the actuator and the pilot valve, which is provided with a one-way flap valve for allowing pressure equalization from the actuator to the brake cylinder.

The means for giving a clutch disengaging signal may be of any suitable type, and the clutch disengaging itself may be performed pneumatically, hydraulically or electrically.

It is, however, preferred to use the air pressure available in the governing device for this purpose. This is according to the invention attained in that the signal giving means is a valve arrangement comprising a spring-biased valve body and normally venting a control chamber to the atmosphere for keeping the spring-biased clutch engaged but opening connection from the actuator to the control chamber for disengaging the clutch, when the actuator pressure acting on one side of the operating device diaphragm is higher than the brake cylinder pressure acting on the other side thereof.

With the design as hitherto described the filling of the spring brake actuator after a complete emptying thereof at the parking of the vehicle will take a rather long time, say 7 to 8 minutes, due to the fact that the air has to pass the calibrated nozzles on its way to the actuator via the pilot valve. This drawback may according to a further feature of the invention be obviated in that there is a check-valve controlled flow-path past the nozzles admitting passage only from the pilot valve to the actuator.

The valve arrangement constituting the signal giving means is held open by the pressure difference on either side of the diaphragm in the operating device. In order to guarantee, however, that the valve opening function is performed during a long time and even if the pressure difference is small, the operating device may have a chamber containing a further diaphragm actuated in the opening direction of the valve arrangement by the same pressure as prevails in the control chamber.

Summarizing, the following positive main features are attained by means of the governing device according to the invention in its basic form:

The spring brake actuator is completely governed for parking purposes by the air pressure in the service brake cylinder according to the following:
 (a) normal service braking—no influence on the spring brake actuator (disarmed position)
 (b) maximum service braking, followed by normal, fast release—the spring brake actuator will be filled with air, ready for action (armed position), but will return to its disarmed position
 (c) maximum service braking, followed by slow release (at parking)—the spring brake actuator will pass to its armed position and will then be activated.

A simultaneous application of the service brake cylinder and the spring brake actuator will be prevented (anti-compound-effect).

The working spring in the spring brake actuator is relaxed at normal service braking, which also means that there is no risk for accidental braking under operation or at service braking and that the air consumption is minimized.

A further feature at the preferred embodiment is that the spring brake actuator after a long parking time may be filled quickly with air under pressure for fast release of the brakes.

Figure 2:
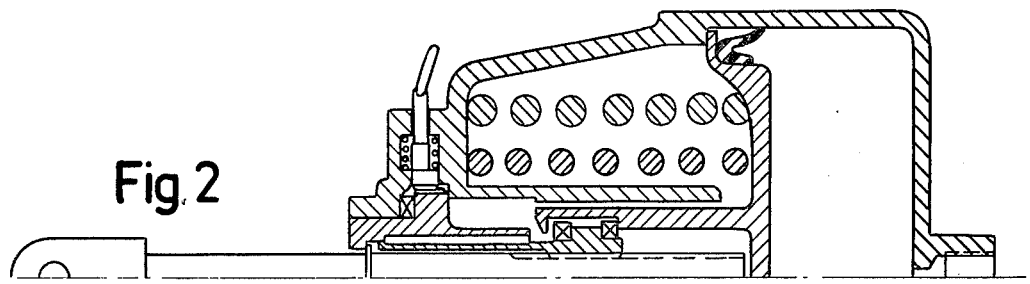
Figure 3:
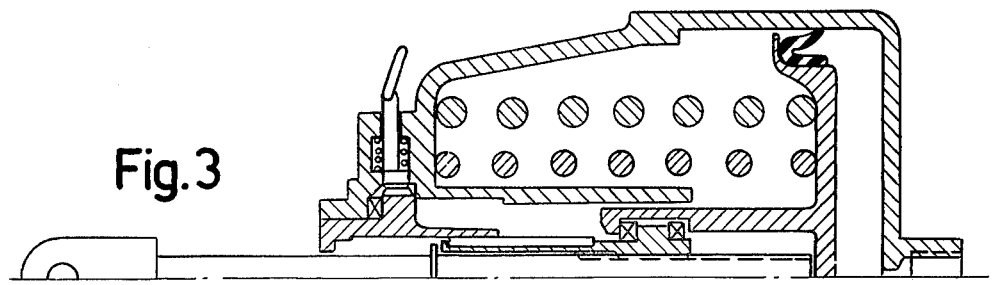
Figure 4:
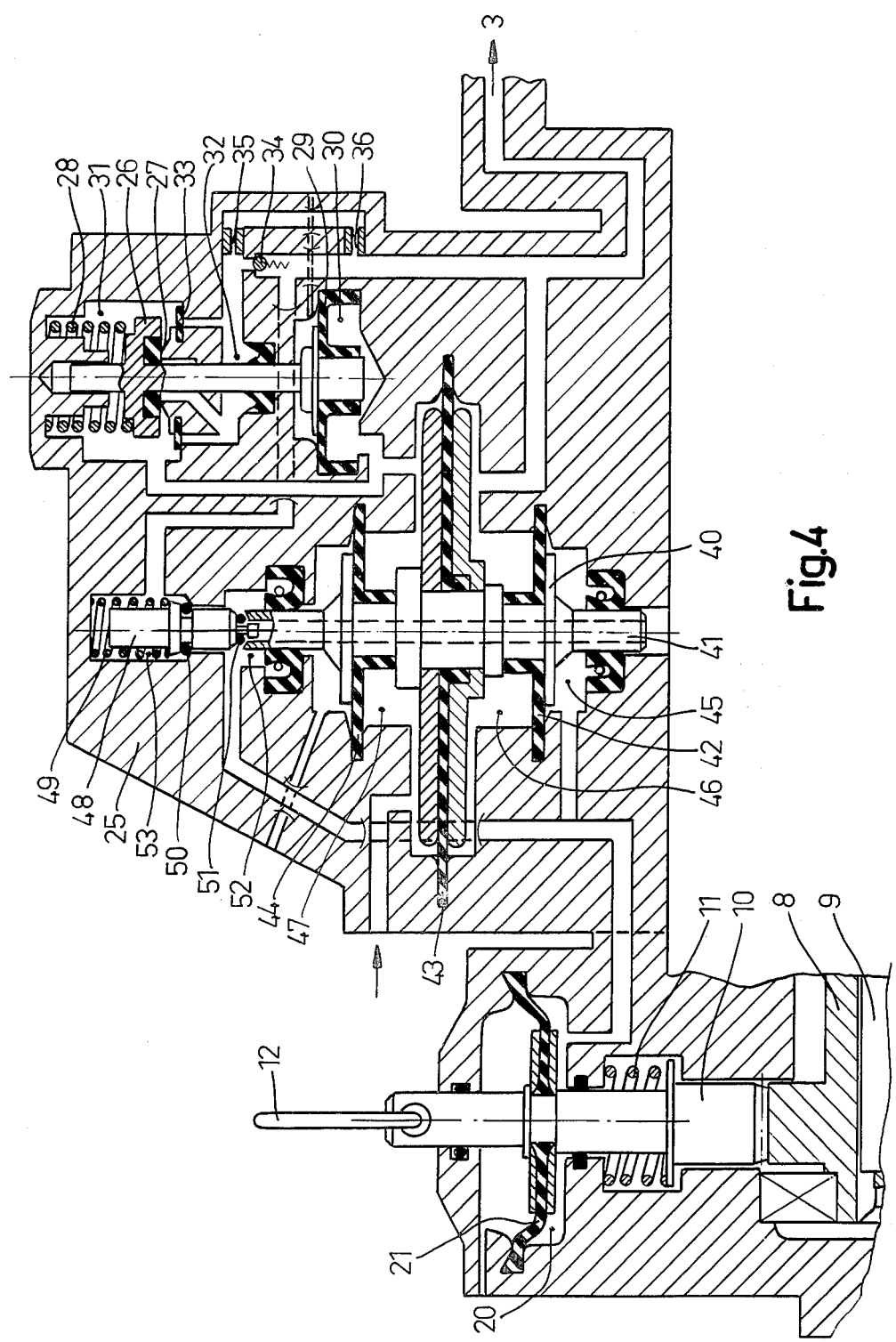

The invention will be described in further detail below reference being made to the accompanying drawings, in which FIGS. 1-3 show a pulling type spring brake actuator, mainly in section and in three different working positions, FIG. 4 is a schematic side view, mainly in section, of a preferred embodiment of a governing device for said actuator, and FIG. 5 in a view corresponding to FIG. 4 shows a second embodiment of a governing device.

A spring brake actuator as shown in FIGS. 1-3 is already known through U.S. Pat. No. 4,063,491, especially its FIG. 2 with related description. A short description is, however, also made here in order to clarify the function of the governing device. The spring brake actuator or its device for discontinuing and automatically restoring its operational function does not form any part of the invention per se.

The different parts are only numbered in FIG. 1, it being understood that the same numerals are applicable in FIGS. 2 and 3.

A spring brake actuator has a cylinder or housing 1 intended for mounting on a suitable part of a vehicle underframe. A piston 2 provided with an ordinary sealing is axially movable in the cylinder 1 under the action of on the one side an air pressure admitted through an inlet 3, on the other side a working spring 4 bearing against the housing 1. A piston sleeve 2' is axially guided by a cylinder sleeve 1'.

A pulling piston rod 5 is threaded and is prevented from rotating by its connection to further parts (not shown) of a vehicle brake rigging. A nut 6 is in non-self-locking engagement with the piston rod 5. As shown, the nut 6 is rotationally journalled in relation to the piston sleeve 2' by means of thrust bearings 7.

A circular control member 8 rotatably but axially immovably arranged in the housing 1 is connected to the nut 6 by means of one or more needles 9 in axial grooves in the member 8 and the nut 6, so that only a relative axial displacement between these two parts will be permitted. The control member 8 is provided with ratchet teeth on its periphery, co-operating with corresponding teeth on a plunger 10 arranged in the housing 1 and biased into engagement with the control member 8 ratchet teeth by means of a spring 11. A pull ring 12 is arranged at the end of the plunger 10 extending out of the housing 1.

A circlip 13 is arranged on the piston rod 5 and acts as a stop therefore together with the control member 8.

A calibrated nozzle 14 is arranged in the inlet 3 for a purpose to be described below.

In the position according to FIG. 1 the actuator is completely inactive, in that the piston 2 bears against the end wall of the cylinder 1 under the action of the working spring 4, whereas the pulling piston rod 5 is in its fully extended inactive position with the circlip 13 against the control member 8. The plunger 10 is shown as lifted, which is a prerequisite for reaching this position, that is called the disarmed position.

In FIG. 2 there is shown the so called armed position of the actuator, in which air under pressure has been admitted through the inlet 3, forcing the piston 2 to the left in the drawing against the action of the working spring 4, whereas the piston rod 5 still is in its shown inactive position. In this case the plunger 10 engages the control member 8 under the action of the spring 11. The locking direction of the ratchet teeth on the control member 8 in such as to allow the nut 6 and control member 8 to rotate together for reaching the shown position but to lock them thereafter.

In the FIG. 3 position the air pressure acting on the piston 2 has been decreased so as to allow the working spring 4 to apply the brakes by pulling the piston rod 5 to the right in the drawing. The position according to FIG. 1 is then reached by pulling out the plunger 10, leaving the piston 2 free to move to the right under the action of the working spring 4 and the piston rod 5 to the left under the action of a return spring (not shown) somewhere in the brake rigging.

I PREFERRED EMBODIMENT

In FIG. 4 there is shown a governing device for a spring brake actuator of the kind shown and described with reference to FIGS. 1-3. Some parts to the left in FIG. 4 may be recognized from FIGS. 1-3, namely the control member 8, a needle 9, the plunger 10 cooperating with the ratchet teeth on the periphery of the member 8, the compression spring 11 urging the plunger 10 into engagement with the control member 8, and the pull ring 12. The engagement between the plunger 10 and the control member 8 may thus be broken manually by pulling out the pull ring 12 and the plunger 10 against the action of the spring 11 but now also pneumatically by admitting pressurized air into an added control chamber 20 under a diaphragm 21 attached to the plunger 10 and clamped into the housing. The spacing above the diaphragm 21 is vented to the atmosphere.

In a valve housing 25, which may be attached to the spring brake actuator housing 1 or may be arranged somewhere else as appropriate, there is provided a governing device with a design as follows:

It consists mainly of two groups: a pilot valve to the right in FIG. 4 and an operating device in the middle thereof (or in other words to the right of the control device 10, 11, 20, 21).

The pilot valve comprises an axially movable valve body 26 sealingly forced against a seat 27 by means of a prestressed compression spring 28. This valve body together with its seat may be called a valve 26, 27. A diaphragm 29 is attached to the lower part of the valve body 26 and is clamped into the housing 25. There is a chamber 30 below the diaphragm 29, and the space above the same is vented to the atmosphere. Further there is one chamber 31 above and one chamber 32 below the valve 26, 27. These two chambers 31 and 32 will be connected to each other if the valve body 26 is lifted by an air pressure acting on the diaphragm 29 and overcoming the force of the spring 28. There is also a rubber flap valve 33 between these two chambers 31 and 32 only allowing passage of air from the latter to the former.

In the vicinity of the pilot valve there is a check valve, preferably in the form of a spring biased ball valve 34. In a branch line at the ball valve 34 there are two calibrated throttling holes or nozzles 35 and 36.

The operating device comprises primarily a movable unit 40-44 and a valve body 48.

The movable unit consists of an axially movable rod-like member 40 with an axial bore 41 therethrough and three diaphragms 42-44, which are attached to the rod and clamped into the housing 25. The working areas of the two diaphragms 42 and 44 are the same and smaller than that of the third diaphragm 43. Three chambers 45, 46 and 47 are formed: the first one 45 below the diaphragm 42, the second one 46 between the diaphragms 42 and 43, and the third one 47 between the two diaphragms 43 and 44. The space above the third diaphragm 44 is vented to the atmosphere.

The valve body 48 is biased downwards in the drawing by a rather weak valve spring 49 of compression type. The valve body 48 is provided with two O-rings 50 and 51, the former one for engaging a shoulder in the housing 25 and the latter one for engaging the upper end of the bored rod 40 so as to prevent air from a chamber 52 from escaping to the atmosphere through the bore 41 under certain conditions. Normally however this passage is open. A chamber 53 is formed above the first O-ring 50, and air from this chamber will normally be prevented from reaching the chamber 52 by the O-ring 50.

The different chambers (30–32 in the pilot valve and 45–47, 52 and 53 in the operating device) are connected to each other by internal conduits in the following way: The chamber 30 is connected to the chamber 47 as well as to the chamber 31, which in turn may be connected to chamber 32 via the valve 26, 27 and also (chamber 32 to 31) past the flap valve 33. The chamber 32 is (via the ball valve 34 and the nozzles 35 and 36 in a way described further below) connected to the chambers 46 and 53 as well as to the inlet 3 of the spring brake actuator as indicated by the arrow to the right in FIG. 4. The chamber 45 is connected to the chamber 52 as well as to the control chamber 20 in the control device 10, 11, 20, 21. The chamber 47 is connected to the same air supply line as an ordinary air pressure controlled service brake cylinder (not shown) on the vehicle; this is indicated by an arrow to the left in FIG. 4.

The operation of the governing device according to FIG. 4 together with a spring brake actuator as shown in FIGS. 1–3 but supplemented with the chamber 20 and diaphragm 21 will be described below. In the different cases it is presupposed that the spring brake actuator is in its disarmed position according to FIG. 1 but with the plunger 10 in engagement with the control member 8 under the action of the spring 11 and also that no air pressure prevails in the service brake cylinder (not shown), which thus is inactive (brakes released).

1. Service braking

At a normal service braking air with the same pressure as to the service brake cylinder will be transmitted to the chamber 47 in the operating device as well as to the chambers 30 and 31 in the pilot valve.

The movable unit 40–44 will be in its lower position, the connection through the bore 41 to the atmosphere from the chamber 20 past the O-ring 51 being open. The flap valve 33 will close the connection to the chamber 32. The force from the prestressed spring 28 overcomes the force from the air in the chamber 30 acting on the diaphragm 29, so that the valve 26, 27 will be kept closed. No air will therefore enter the chambers 53 and 46 or the spring brake actuator through its inlet 3. The spring brake actuator will remain in its disarmed position according to FIG. 1 with its working spring 4 completely relaxed and its piston rod 5 in its unapplied position.

2. Maximum service braking or emergency braking followed by normal brake release 2.1 Application At a maximum service braking a maximum air pressure will be transmitted to the service brake cylinder. This pressure is considerably higher than that obtained at a normal service braking.

This maximum air pressure will also prevail in the chambers 47, 30 and 31. The movable unit 40–44 will be in its lower position holding the connection open through the bore 41 to the atmosphere from the chamber 20 via the chamber 52. The force upwards on the valve body 26 from the air in the chamber 30 will now overcome the force from the prestressed spring 28, so that the valve 26, 27 will open. The air will thus flow past the ball valve 34 (and the calibrated nozzles 35 and 36) to the chamber 46 in the movable unit 40–44, which still is in its lower position due to the working areas of the diaphragms, and to the spring brake actuator through its inlet 3. The spring brake actuator will attain its position according to FIG. 2, i.e. its armed position, with the piston 2 locked in its active position (under the force from the working spring 4) due to the interaction between the plunger 10 and the control member 8 by ratcheting action of the before mentioned ratchet teeth and with the piston rod 5 in its inactive position (when the brake is released), i.e. the brake is not applied by the spring brake actuator.

2.2 Normal release

At a normal brake release the air pressure in the service brake cylinder and thus in the chamber 47 will decrease comparatively fast.

Due to the calibrated nozzles 36 and 35 (the ball valve 34 being closed in this direction) the air pressure will decrease slowly in the spring brake actuator as well as in the chamber 46. As the valve 26, 27 is closed, the flap valve 33 will open. Due to the pressure difference between the chambers 46 and 47 on either side of the diaphragm 43 the movable unit 40–44 will move upwards. The O-ring 51 on the valve body 48 closes the bore 41 and prevents connection to the atmosphere from the chamber 20 in the control device. Thereafter the O-ring 50 of the valve body 48 will be lifted from its seat leaving passage from the chamber 53 to the chamber 20. In this way the plunger 10 will be lifted from its locking engagement with the control member 8, so that when the piston 2 moves to the right in FIG. 2 under the action of the working spring 4 the piston rod 5 will remain in its inactive position. This movement of the piston 2 will be controlled by the calibrated nozzle 14 in the inlet 3 to the spring brake actuator.

The piston 2 will reach its end position according to FIG. 1, before the plunger 10 again will move into engagement with the control member 8. The spring brake actuator will thus once more be in its disarmed and inactive position according to FIG. 1.

3. Maximum service braking at the parking of the vehicle.

3.1. Application

The same operation as described above under 2.1 will be performed.

3.2 Release by slow air pressure decrease

At a slow air pressure decrease in the service brake cylinder and thus in the chambers 47, 30 and 31 the pressure decrease in the spring brake actuator and in the chamber 46 will have the same rate in spite of the nozzles 35 and 36, which means that the movable unit 40–44 will remain in its lower position leaving the passage from the chamber 20 open to the atmosphere via the chamber 52 and the bore 41 and keeping the O-ring 50 sealingly against its seat under the action of the valve spring 49.

Due to the locking engagement of the plunger 10 with the control member 8 the piston 2, moving to the right under the action of the working spring 4, will be operatively connected to the piston rod 5. The result will be a brake application (the position according to FIG. 3).

4. Manual spring brake release

After brake application in the way described above the spring brake actuator may be deactivated manually and the brake released by pulling out the plunger 10 by means of either the pull ring 12 or a remote control accessible at the side of the vehicle. Such pulling out of the plunger 10 will have to effect that the FIG. 1 position will be attained.

Due to the calibrated nozzle 14 in the inlet 3 the piston 2 will move in a controlled and smooth way. The piston rod 5 will move to the position according to FIG. 1 under the action of a return spring in the brake rigging.

II SECOND EMBODIMENT

Figure 5:
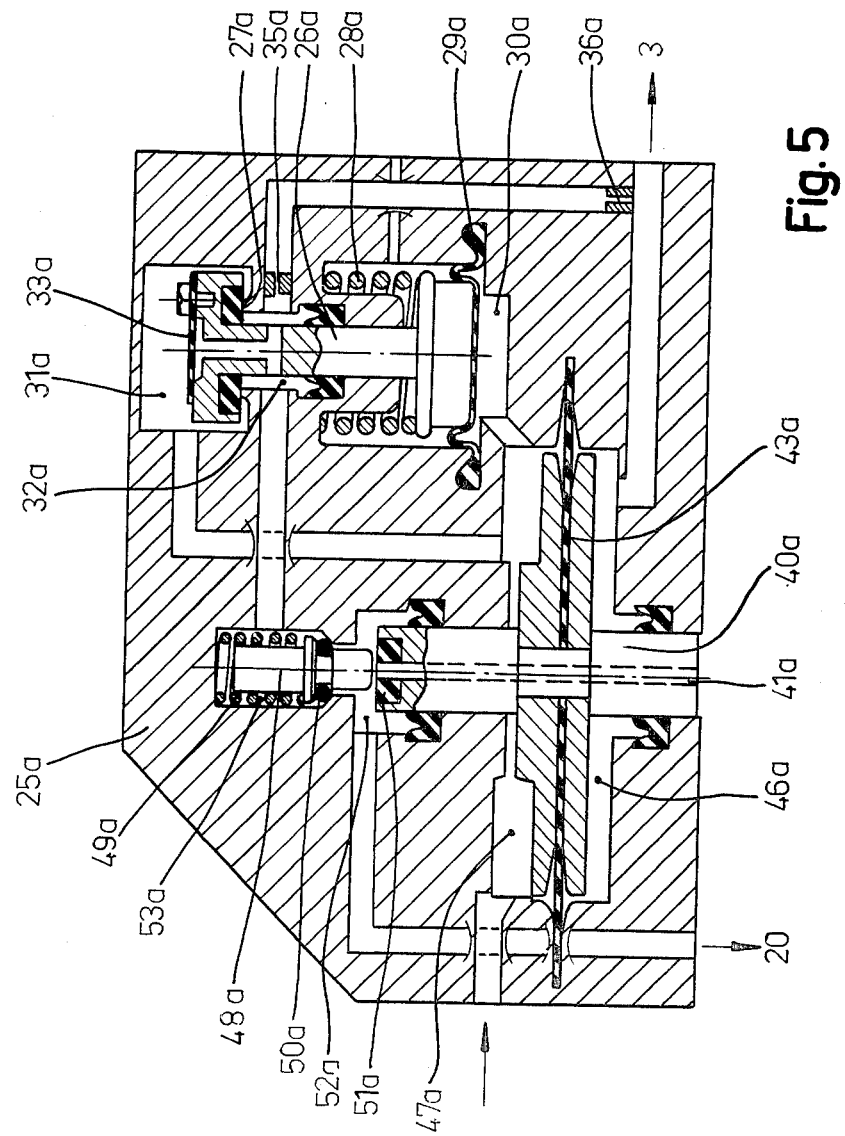

A second and somewhat simplified version of the governing device is shown in FIG. 5 Parts with the same function as corresponding parts in the FIG. 4 version have the same numbers as therein with the suffix a.

In a common valve housing 25a there is a pilot valve to the right and an operating device to the left.

The pilot valve comprises a valve body 26a sealingly forced against a seat 27a by a prestressed spring 28a. A valve 26a, 27a is thus formed. A diaphragm 29a is arranged at the lower part of the valve body 26a, and thereunder a chamber 30a is formed. The space over the diaphragm containing the spring 28a is vented to the atmosphere. Further there is one chamber 31a over and one chamber 32a below the valve 26a, 27a. These two chambers will be connected to each other at the lifting of the valve body 26a. There is also a rubber flap valve 33a on the valve body 26a only allowing air passage through the valve body 26a from the chamber 32a to the chamber 31a.

In the vicinity of the pilot valve there are two calibrated throttling holes or nozzles 35a and 36a.

The operating device comprises primarily a movable unit 40a, 43a and a valve body 48a.

The movable unit consists of a rod-like member 40a with an axial bore 41a therethrough and a diaphragm 43a attached thereto. Two chambers are formed: one chamber 46a below the diaphragm 43a and one chamber 47a over the same.

The valve body 48a is biased downwards in the drawing by a valve spring 49a and is provided with an O-ring 50a for engaging a shoulder in the housing 25a. In the upper part of the rod-like member 40a there is a rubber seat 51a around the bore 41a. When the rubber seat 51a engages the lower end of the valve body 48a the passage of air from a chamber 52a to the atmosphere through the bore 41a will be prevented. Normally however this passage is open. A chamber 53a is formed above the O-ring 50a, and air from this chamber will normally be prevented from reaching the chamber 52a by the O-ring 50a.

The different chambers are connected to each other by internal conduits in the following way: The chamber 30a is connected to the chamber 47a as well as to the chamber 31a. The chamber 32a is connected to the chambers 46a and 53a as well as to the inlet 3 of the spring brake actuator as indicated by an arrow to the right in FIG. 5. The chamber 52a is connected to the control chamber 20 in the control device (FIG. 4) as indicated by an arrow in the lower part of FIG. 5. The chamber 47a is connected to the same air supply line as an ordinary air pressure controlled service brake cylinder (not shown) on the vehicle; this is indicated by an arrow to the left in FIG. 5.

The operation of the governing device according to FIG. 5 together with a spring brake actuator as shown in FIGS. 1–3 but supplemented with the chamber 20 and diaphragm 21 (FIG. 4) will be described below. In the different cases it is presupposed that the spring brake actuator is in its disarmed position according to FIG. 1 but with the plunger 10 in engagement with the control member 8 under the action of the spring 11 and also that no air pressure prevails in the service brake cylinder (not shown) which thus is inactive (brakes released).

1a. Service braking

At a normal service braking air with the same pressure as to the service brake cylinder will be transmitted to the chamber 47a in the operating device as well as to the chambers 30a and 31a in the pilot valve.

The movable unit 40a, 43a will be in its lower position, the connection through the bore 41a to the atmosphere from the chamber 52a being open. The flap valve 33a will close the connection to the chamber 32a. The force from the prestressed spring 28a overcomes the force from the air in the chamber 30a acting on the diaphragm 29a, so that the valve 26a, 27a will be kept closed. No air will therefore enter the chambers 53a and 46a or the spring brake actuator through its inlet 3. The spring brake actuator will remain in its disarmed position according to FIG. 1 with its working spring 4 completely relaxed and its piston rod 5 in its unapplied position.

2a. Maximum service braking or emergency braking followed by normal brake release

2a.1 Application

At a maximum service braking a maximum air pressure will be transmitted to the service brake cylinder. This pressure is considerably higher than that obtained at a normal service braking.

This maximum air pressure will also prevail in the chambers 47a, 30a and 31a. The movable unit 40a, 43a will be in its lower position holding the connection open through the bore 41a to the atmosphere from the chamber 52a. The force upwards on the valve body 26a from the air in the chamber 30a will now overcome the force from the prestressed spring 28a, so that the valve 26a, 27a will open. The air will thus flow to the chamber 46a in the movable unit 40a, 43a, which still is in its lower position due to the fact that the working areas of the diaphragm 43a are the same on either side. The air will also flow to the spring brake actuator (through its inlet 3), which will attain its position according to FIG. 2, i.e. its armed position, with the piston 2 locked in its active position (under the force from the working spring 4) due to the interaction between the plunger 10 and the control member 8 and with the piston rod 5 in its inactive position, i.e. the brake is not applied by the spring brake actuator.

2a.2 Normal release

At a normal brake release the air pressure in the service brake cylinder and thus in the chamber 47 will decrease comparatively fast.

Due to the calibrated nozzles 35a and 36a the air pressure will decrease slowly in the spring brake actuator as well as in the chamber 46a. As the valve 26a, 27a is closed, the flap valve 33a will open. Due to the pressure difference between the chambers 46a and 47a on either side of the diaphragm 43a the movable unit 40a, 43a will move upwards. The valve 48a, 51a closes and prevents connection to the atmosphere from the chamber 52a. Thereafter the O-ring 50a of the valve body 48a will be lifted from its seat leaving passage from the chamber 53a to the chamber 52a and further to the control chamber 20 (FIG. 4). In this way the plunger 10 will be lifted from its locking engagement with the control member 8, so that when the piston 2 moves to the right in FIG. 2 under the action of the working spring 4 the piston rod 5 will remain in its inactive position. This movement of the piston 2 will be controlled by the calibrated nozzle 14 in the inlet 3 to the spring brake actuator.

The piston 2 will reach its end postion according to FIG. 1, before the plunger 10 again will move into engagement with the control member 8. The spring brake actuator will thus once more be in its disarmed and inactive position according to FIG. 1.

3a Maximum service braking at the parking of the vehicle

3a.1 Application

The same operation as described above under 2a.1 will be performed.

3a.2 Release by slow air pressure decrease

At a slow air pressure decrease in the service brake cylinder and thus in the chambers 47a, 30a and 31a the pressure decrease in the spring brake actuator and in the chamber 46a will have the same rate in spite of the nozzles 35a and 36a, which means that the movable unit 40a, 43a will remain in its lower position leaving the passage from the chamber 20 (FIG. 4) open to the atmosphere via the chamber 52a and the bore 41a and keeping the O-ring 50 sealingly against its seat under the action of the valve spring 49a.

Due to the locking engagement of the plunger 10 with the control member 8 the piston 2, moving to the right under the action of the working spring 4, will be operatively connected to the piston rod 5. The result will be a brake application (the position according to FIG. 3).

4a Manual spring brake release

See 4 above.

It is again to be stressed that the spring brake actuator does not form any part of the invention and that the actuator quite as well may be of the pushing type. Further the service brake cylinder and the spring brake actuator may act on the same or separate brake riggings.

In the appended claims it is understood that the numerals refer to both embodiments.

We claim:

1. In a fluid pressure operated system including a spring brake actuator having spring biased clutch means for disengagement of and thereafter automatically restoring engagement of the spring brake actuator when fluid pressure is absent, governing means supplied with said fluid pressure, comprising in combination, a braking system wherein the spring brake actuator is actuated by fluid supply means for selectively applying fluid at varying pressures for service braking, a source of fluid supplying said fluid at varying pressure for said service braking and the spring brake actuator, a pilot valve with a valve-closing prestressed bias spring and pressure actuated pilot diaphragm coupled to said source to admit fluid under pressure to said spring brake actuator when the pilot valve is overcome by maximum prevailing service braking pressure, an operating device comprising an operating diaphragm, means supplying on opposite sides of the operating diaphragm service braking pressure and said maximum prevailing pressure, valve means operated by the diaphragm for giving a clutch disengaging signal when the spring brake actuator pressure is higher than the service braking pressure, and calibrated nozzle means releasing pressure in said spring brake actuator slowly.

2. Governing means as defined in claim 1 characterized in that the calibrated nozzle means comprise two nozzles coupling said pilot valve with said spring brake actuator.

3. Governing means as defined in claim 2 comprising an input flow path with a check valve controlling flow therethrough connected to prevent flow from the nozzles and for permitting flow into the nozzles from said pilot valve.

4. Governing means as defined in claim 1 characterized in that the valve means is a valve arrangement comprising a spring-biased open valve body venting a control chamber to atmosphere, means coupling said valve body to said spring biased clutch means to keep it engaged when venting and disengaged when the actuator pressure acting on one side of the operating device diaphragm is higher than said braking pressure acting on the other side thereof.

5. Governing means as defined in claim 4 characterized in that the operating device has a chamber containing a further diaphragm coupled for actuation in the clutch means opening direction of the operating device by the pressure in said control chamber.

* * * * *